(12) United States Patent
Crabill

(10) Patent No.: US 6,725,364 B1
(45) Date of Patent: Apr. 20, 2004

(54) CONFIGURABLE PROCESSOR SYSTEM

(75) Inventor: Eric J. Crabill, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 582 days.

(21) Appl. No.: 09/803,524

(22) Filed: Mar. 8, 2001

(51) Int. Cl.[7] .............................................. G06F 9/455
(52) U.S. Cl. ........................ 712/227; 712/1; 712/200; 712/248
(58) Field of Search ................... 703/26, 27; 712/227, 712/248, 1, 200

(56) References Cited

U.S. PATENT DOCUMENTS

| | | | | |
|---|---|---|---|---|
| 5,574,927 A | * | 11/1996 | Scantlin | 712/41 |
| 5,721,855 A | * | 2/1998 | Hinton et al. | 712/218 |
| 5,796,981 A | * | 8/1998 | Abudayyeh et al. | 703/27 |
| 5,799,169 A | * | 8/1998 | Kalapathy | 703/25 |
| 5,802,359 A | * | 9/1998 | Webb et al. | 712/227 |
| 5,832,251 A | * | 11/1998 | Takahashi | 703/23 |
| 5,968,161 A | * | 10/1999 | Southgate | 712/37 |
| 6,081,888 A | | 6/2000 | Bell et al. | |
| 6,134,707 A | * | 10/2000 | Herrmann et al. | 717/139 |
| 6,272,453 B1 | * | 8/2001 | Hoerig et al. | 703/27 |
| 6,341,345 B1 | * | 1/2002 | Auslander et al. | 712/204 |
| 6,438,679 B1 | * | 8/2002 | Sollars | 712/208 |

OTHER PUBLICATIONS

Davidson, J., "FPGA Implementation of a Reconfigurable Microprocessor", Proceedings of the IEEE Custom Integrated Circuits Conference, May 9–12, 1993, pp. 3.2.1–3.2.4.*

Wirthlin et al., "The Nano Processor: A Low Resource Reconfigurable Processor", Proceedings of the IEEE Workshop on FPGAs for Custom Machines, Apr. 10–13, 1994, pp. 23–30.*

Xilinx, "The Programmable Logic Data Book 2000", Chapter 3, available from Xilinx, Inc., 2100 Logic Drive, San Jose, California 95124.

* cited by examiner

Primary Examiner—William M. Treat
(74) Attorney, Agent, or Firm—H. C. Chan

(57) ABSTRACT

A programmable integrated circuit can be designed to emulate, on demand, one of several commonly used microprocessors. It contains a configurable instruction processing unit and a superset datapath unit. The instruction processing unit further contains a configurable microcode unit and a non-configurable sequencing unit. The programmable integrated circuit can be programmed so that a microcode compatible with a target microprocessor is installed in the configurable microcode unit. The superset datapath unit is a superset of the datapath elements of all the target microprocessors.

5 Claims, 3 Drawing Sheets

US 6,725,364 B1

CONFIGURABLE PROCESSOR SYSTEM

FIELD OF THE INVENTION

The present invention generally relates to data processor systems, and more particularly to a user selectable data processor system implemented on a programmable logic device.

BACKGROUND OF THE INVENTION

Microprocessors are one of the most versatile electronic devices used by engineers. Typically, a microprocessor is able to recognize and execute a predetermined set of instructions (e.g., add, compare, subtract, jump, etc.). Engineers can direct a microprocessor to handle different tasks by writing different computer programs using the same set of instructions. As a result, different types of products can use the same microprocessor by changing the associated computer programs.

Although a microprocessor can handle many different tasks, it does not mean that it can perform all the tasks efficiently. As an example, a microprocessor having instructions that can perform only integer operations can theoretically handle all kinds of arithmetic operations. However, it may be more efficient to use a microprocessor that has floating point instructions if a task involves a large number of complex computational operations. Similarly, a microprocessor only needs to have a small number of registers to perform most tasks. However, a large number of registers may speed up tasks involving databases and tables.

The design of a microprocessor involves many compromises. For example, a microprocessor that is hardwired to execute floating point instructions is much more complicated than one that can execute only integer instructions. As a result, the cost is higher. Thus, some microprocessor manufacturers market a low cost microprocessor that can execute integer instructions only and a higher cost microprocessor that is hardwired to execute both integer and float point instructions. Similarly, different kinds of microprocessors have different numbers of registers, addressing modes, etc.

This proliferation of microprocessors presents an opportunity and also a problem to engineers. On the one hand, it is good to be able to select different microprocessors to optimize the designs of various products in a company. On the other hand, it is a headache to maintain inventory of the various ICs if many microprocessors are used. Thus, for those companies that have many product lines, it may be difficult to make a choice between fewer inventory problems and better product design.

SUMMARY OF THE INVENTION

The above problems can be solved by having a single IC that can emulate, on demand, one of several commonly used microprocessors.

The IC of the present invention is a programmable IC. It contains a configurable instruction processing unit and a superset datapath unit. The instruction processing unit further contains a configurable microcode unit and a non-configurable sequencing unit. The programmable IC can be programmed so that the microcode compatible with a target microprocessor is installed in the configurable microcode unit. The datapath unit is a superset of the datapath elements of all the target microprocessors. As an example, the register files of the superset datapath unit contains the largest number of registers (of various data widths) used in the target microprocessors. Similarly, the arithmetic logic unit (ALU) in the IC is able to execute all the arithmetic and logic operations of all the target microprocessors. The microcode in the instruction processing unit will select the correct registers and ALU operations so as to emulate the corresponding target microprocessor.

The above summary of the present invention is not intended to describe each disclosed embodiment of the present invention. The figures and detailed description that follow provide additional example embodiments and aspects of the present invention.

BRIEF DESCRIPTION OF THE DRAWINGS

The present invention is illustrated by way of example, and not by way of limitation, in the following figures, in which like reference numerals refer to similar elements.

DETAILED DESCRIPTION OF THE INVENTION

In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
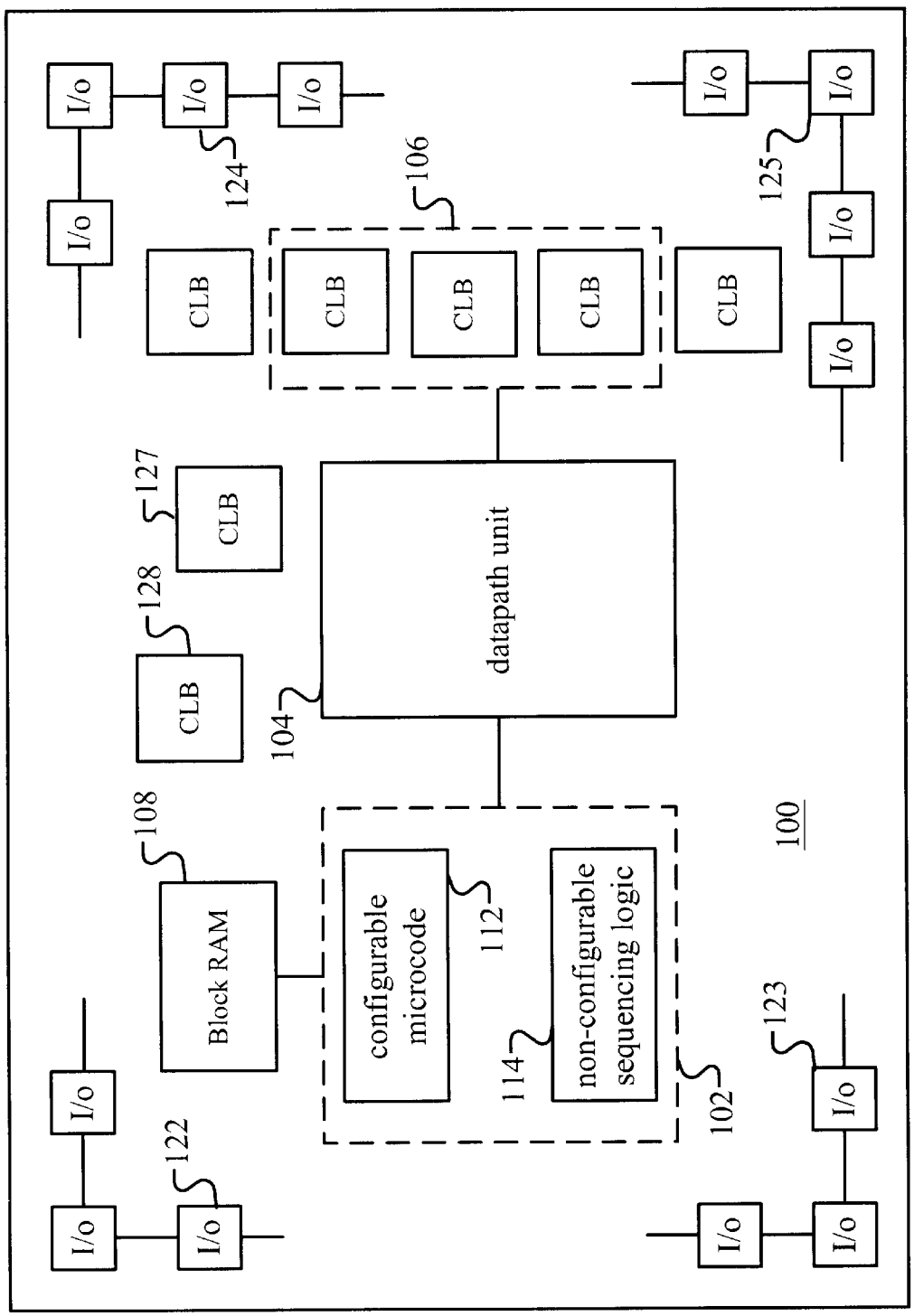
FIG. 1 is a block diagram of an IC containing a configurable processor system of the present invention.

FIG. 1 is a block diagram of an IC 100 containing a configurable processor system of the present invention. IC 100 contains a configurable instruction processing unit 102 and a superset datapath unit 104. An optional block RAM 108 is attached to instruction processing unit 102. A peripheral device 106 may be configurable and implemented in the programmable logic or off chip. Instruction processing unit 102 further contains a configurable microcode unit 112 and a non-configurable sequencing logic 114. The details of these elements will be described below. After configuration, IC 100 will behave the same way as one of a plurality of microprocessor systems.

In one embodiment of the present invention, IC 100 is a field programmable gate array that further contains a plurality of input-output (I/O) blocks, such as blocks 122–125, and a plurality of configurable logic blocks (CLBs), such as blocks 127–128. Detail description of these blocks can be found in "The Programmable Logic Data Book 2000," Chapter 3, published by Xilinx, Inc, the content of which is incorporated herein by reference. These blocks can be used to build other circuits and peripherals that may be connected to the configurable processor system of the present invention.

Figure 2:
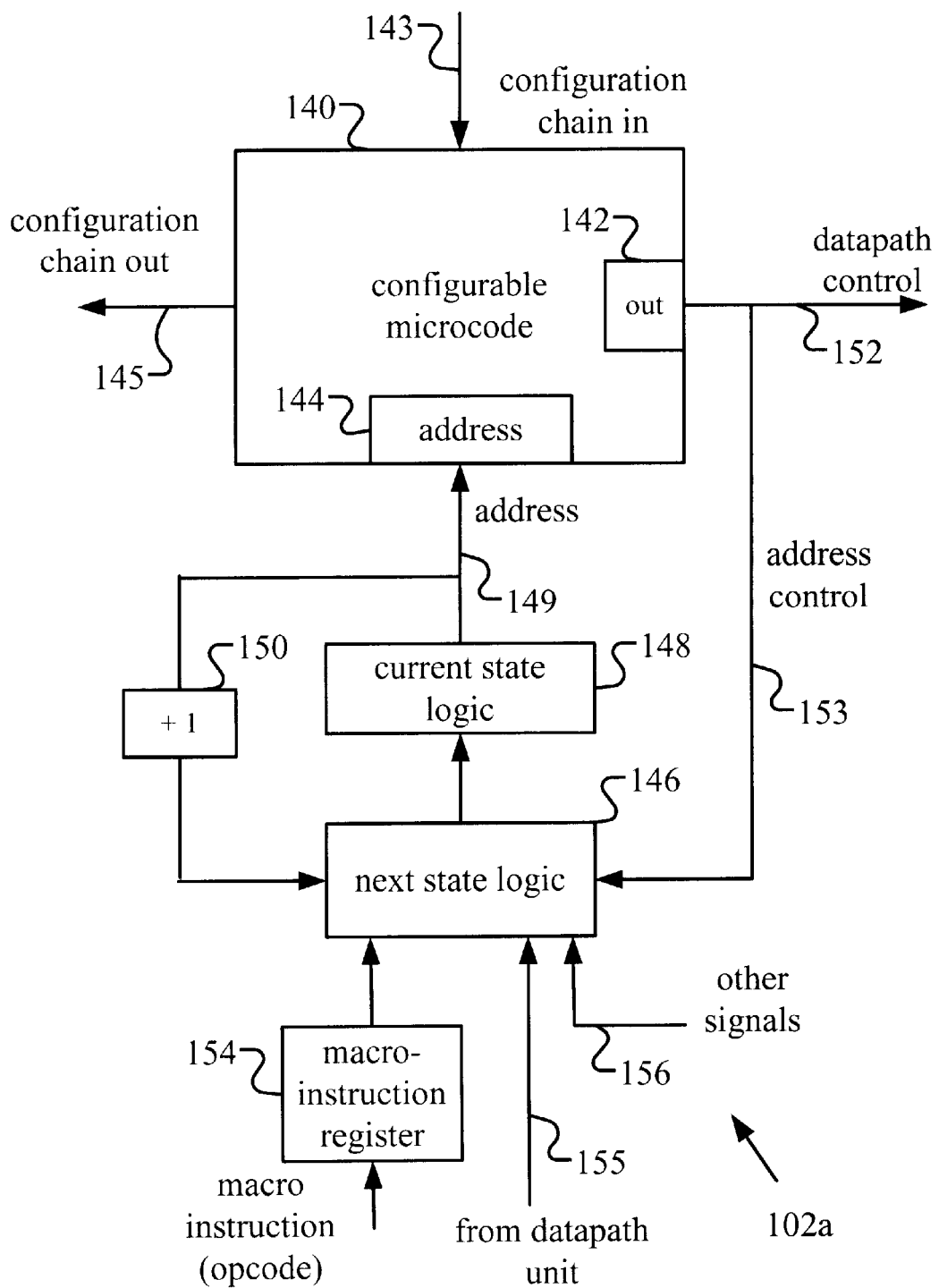
FIG. 2 is a block diagram showing a configurable instruction processing unit of the present invention.

FIG. 2 is a block diagram of an embodiment 102a of configurable instruction processing unit 102. Instruction processing unit 102a accepts macroinstructions (such as the opcode of a target microprocessor) and generates corresponding outputs to drive superset datapath unit 104. The macroinstructions may be stored in block RAM 108 or external memory (not shown). Instruction processing unit 102a comprises a configurable microcode storage 140 that contains microcodes. By configuring different microcodes in microcode storage 140, IC 100 can emulate the behavior of different target microprocessors. The microcodes in storage 140 may not be the same as the actual microcodes implemented in the actual target microprocessor. This is because the physical structures of IC 100 and superset datapath unit 104 may be different from the actual target microprocessor. However, it is important that the behavior of IC 100 is the same as the target microprocessor and its peripherals. This is sometimes referred to as "binary software compatibility."

Microcode storage 140 has an output port 142 and an input address port 144. Microcode storage 140 accepts a microcode address from address port 144 and outputs datapath control signals on a bus 152 to datapath unit 104 and address control signals on a bus 153 to a next state logic 146. The datapath control signals cause datapath unit 104 to perform certain operations related to the target microprocessor. The address control signals are used by next state logic 146 to determine the next microcode address.

Next state logic 146 accepts macroinstructions from a macroinstruction register 154, the address control signals from output port 142, an address increment signal generated by an address increment circuit 150, signals on a bus 155 from datapath unit 104, and other signals on a bus 156. The other signals include signals generated by on-chip peripheral devices 106 (e.g., interrupt request) and external to IC 100 (e.g., reset). In many cases, a single macroinstruction triggers several microcode instructions. Next state logic 146 then causes current state logic 148 to generate a next microcode address on an address bus 149 for inputting to address port 144 of microcode storage 140. Microcode storage 140 then generates the next output corresponding to the microcode of the new address. The corresponding datapath control signals is then delivered by output port 142 to datapath unit 104.

In FIG. 2, microcode storage 140 is configurable. A user can select a target microprocessor, and configure storage 140 with a microcode that allows the configurable processor system to behave like the target microprocessor. On the other hand, current state logic 118, next state logic 146, macroinstruction register 154 and address increment circuit 150 do not need to be configurable. These non-configurable components can be implemented compactly because no routing circuits need to be included. As a result, the performance of the present system is improved.

In an embodiment using field programmable gate array ICs, microcode storage 140 can be implemented as a configurable single port RAM. It can be configured using an input configuration bitstream 143. The output configuration bitstream 145 is used to configure other parts of IC 100.

Figure 3:
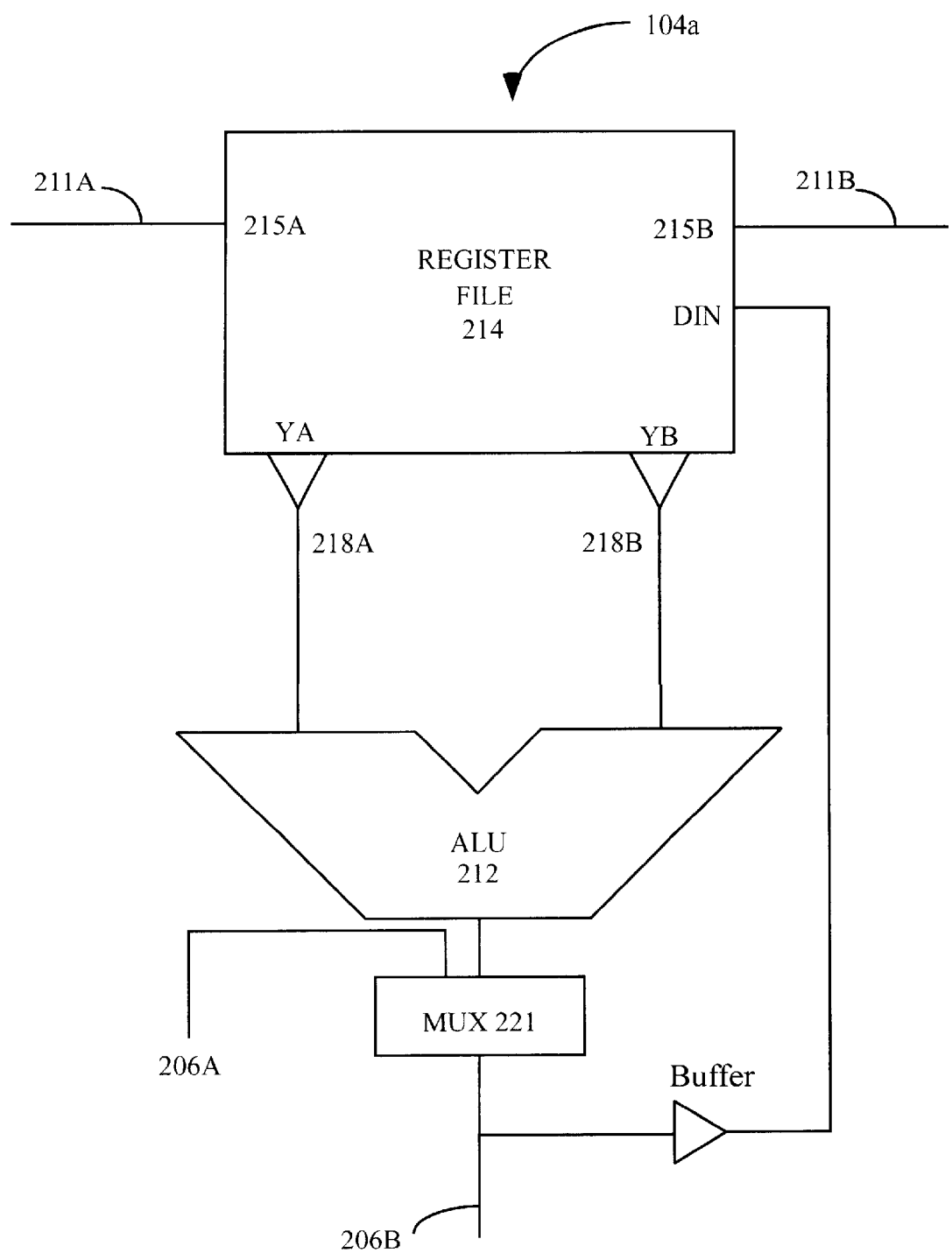
FIG. 3 is a block diagram of a superset datapath of the present invention.

The structure of datapath unit 104 is now described in detail. FIG. 3 shows a datapath unit 104a of the present invention. It includes an ALU 212, a register file 214 and a multiplexer 221. An address on bus 211A (which is part of the datapath control bus 152) is provided to an input port 215A of register file 214, which selects an output signal YA. Similarly another address on bus 211B (which is also part of the datapath control bus 152) is provided to an input port 215B of register file 214, which selects a second output signal YB. In this manner, output signals YA and YB are provided simultaneously at the output ports of register file 214 on output lines 218A and 218B, respectively. Multiplexer 221 is programmed to transfer either the output signal from ALU 212 or the output signal via line 206A from memory (such as block RAM 108, external memory, or the output signal from a peripheral device) to a line 206B.

In datapath unit 104a, register file 214 is a superset of the register files of all the target microprocessors. Different microprocessors work with different numbers of registers. Further, the width of registers may also be different (e.g., an 8 bit microprocessor may contain 8 and/or 16 bit registers). Register file 214 of the present invention contains all the registers that may be needed by all the target microprocessors.

ALU 212 is also a superset of all target microprocessors. It is able to execute all the arithmetic and logic operations required by all the microprocessors, i.e., the set of executable operations is the union of all operations of the target microprocessors.

The microcodes of the present invention are written to be able to select the appropriate registers in register file 214 and the appropriate operations of ALU 212 in order to emulate the target microprocessor. As a result, the microcodes used in the present system may be different from the microcodes of the target microprocessor.

Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

What is claimed is:

1. An integrated circuit that can emulate one of a plurality of microprocessors each having registers and executing macroinstructions, said integrated circuit comprising:
   a configurable portion storing a microcode;
   a non-configurable sequencing logic portion; and
   a datapath unit having a register file that is a superset of said registers of said plurality of microprocessors;
   wherein said configurable portion, said sequencing logic portion and said datapath unit can execute said macroinstructions to generate compatible results as said one microprocessor.

2. The integrated circuit of claim 1 further comprising a block RAM containing said macroinstructions.

3. The integrated circuit of claim 1 further comprising an on-chip peripheral.

4. The integrated circuit of claim 1 wherein said integrated circuit is a field programmable gate array.

5. The integrated circuit of claim 4 further comprising an on-chip peripheral implemented using configurable logic blocks.

* * * * *